(12) United States Patent
Henke et al.

(10) Patent No.: US 6,933,473 B2
(45) Date of Patent: Aug. 23, 2005

(54) HIGH SPEED COOKING OVEN HAVING AN AIR IMPINGEMENT HEATER WITH AN IMPROVED ORIFICE CONFIGURATION

(75) Inventors: Mitchell C. Henke, Fort Wayne, IN (US); Carol S. Nealley, Fort Wayne, IN (US)

(73) Assignee: Lincoln Foodservice Products Inc., Fort Wayne, IN (US)

( * ) Notice: Subject to any disclaimer, the term of this patent is extended or adjusted under 35 U.S.C. 154(b) by 0 days.

(21) Appl. No.: 10/862,772

(22) Filed: Jun. 7, 2004

(65) Prior Publication Data

US 2004/0262286 A1 Dec. 30, 2004

Related U.S. Application Data

(60) Provisional application No. 60/477,421, filed on Jun. 10, 2003.

(51) Int. Cl.[7] .............................. A21B 1/26; F27B 9/10
(52) U.S. Cl. ........................ 219/400; 219/388; 126/214
(58) Field of Search ................................ 219/388, 400; 99/443 C, 386, 474–476; 126/21 A

(56) References Cited

U.S. PATENT DOCUMENTS

| | | | | |
|---|---|---|---|---|
| 3,222,800 A | * | 12/1965 | Siegel et al. ................ 219/388 |
| 3,861,378 A | * | 1/1975 | Rhoads et al. ............ 126/21 A |
| 4,873,107 A | | 10/1989 | Archer ........................ 426/520 |
| 5,832,812 A | | 11/1998 | Wolfe et al. ............... 99/443 C |
| 5,881,636 A | | 3/1999 | Sweet et al. ............... 99/443 C |
| 5,934,178 A | | 8/1999 | Caridis et al. ................. 99/330 |
| 6,250,296 B1 | * | 6/2001 | Norris et al. ............. 126/21 A |
| 6,259,064 B1 | * | 7/2001 | Wilson ........................ 219/400 |
| 6,595,117 B1 | * | 7/2003 | Jones et al. .................... 99/386 |
| 6,615,819 B1 | * | 9/2003 | Hernandez Burgos et al. ... 126/21 A |
| 6,817,283 B2 | * | 11/2004 | Jones et al. .................... 99/386 |
| 2003/0056658 A1 | | 3/2003 | Jones et al. .................... 99/386 |
| 2003/0217645 A1 | | 11/2003 | Jones et al. .................... 99/386 |

OTHER PUBLICATIONS

PCT International Search Report dated Sep. 15, 2004 from corresponding International Application No. PCT/US04/18174.

* cited by examiner

Primary Examiner—Joseph Pelham
(74) Attorney, Agent, or Firm—Ohlandt, Greeley, Ruggiero & Perle, L.L.P.

(57) ABSTRACT

An air impingement oven having a conveyor belt assembly for moving food through a heat treatment passage. The air impingement oven has a fan, a supply duct, a plenum and a number of jet fingers being disposed above the conveyor belt assembly. The jet fingers have a base portion having a number of orifices for directing the impingement air onto the food. The orifices have an improved configuration. The improved configuration intensifies the airflow on the food to penetrate heat into the food surface thereby improving heat transfer. The improved configuration reduces a cooking time of the food in the air impingement oven.

26 Claims, 8 Drawing Sheets

HIGH SPEED COOKING OVEN HAVING AN AIR IMPINGEMENT HEATER WITH AN IMPROVED ORIFICE CONFIGURATION

CROSS REFERENCE TO RELATED PATENT APPLICATIONS

This application under 35 U.S.C. § 119 hereby claims priority to U.S. Provisional Patent Application No. 60/477,421 filed on Jun. 10, 2003, the entire contents of which is hereby incorporated by reference in its entirety.

FIELD OF THE INVENTION

This invention relates to a high speed cooking oven used in commercial cooking. More particularly, the present invention relates to a cooking device that is capable of rapidly cooking food using an air impingement heater having an improved orifice configuration.

BACKGROUND OF THE INVENTION

Ovens such as tunnel ovens for cooking bread products are known in the art. Tunnel ovens use air impingement heaters. The air impingement heaters are used in toasting/cooking bread products such as pizza, toast and the like. One example of such a tunnel oven is shown in U.S. Pat. No. 4,873,107 to Archer. Archer discloses a tunnel oven. The tunnel oven has a conveyor belt for moving food through a heat treatment passage, a fan, a number of jets, a number of slots and a first and a second plenum.

The first and the second plenum have the air slots and the jets discharging air at a predetermined temperature. This air is blown through a round array of air slots onto the food that is on the conveyor belt. The array of air slots is generally uniform in shape. The air slots are round in shape. Although effective, this round air slot shape limits the cooking of the food and also limits heat transfer on to the surface of the food. The air slots limit the air being discharged to sweeping across the surface of the food. Although effective in cooking and/or toasting an outer surface of the food a detriment is that an inner surface of the food can potentially remain raw or relatively less cooked than desired due to this sweeping of the air stream across the food.

Accordingly, there is a need for an improved cooking device that is capable of rapidly cooking food.

There is a further need for a cooking device having an air impingement heater that provides air at a predetermined temperature that sweeps across the surface of the food and that selectively cooks the inner surface.

There is a need for such a cooking device that provides air at a predetermined temperature that penetrates heat through the surface of the food.

There is a need for such a cooking device that provides air at a predetermined temperature that sweeps across the surface of the food and penetrates heats through a top surface of the food.

There is a need for such a cooking device that can be easily cleaned.

There is a need for such a cooking device that has an improved orifice configuration.

SUMMARY OF THE INVENTION

An air impingement oven of the present invention has a conveyor that conveys a food product between a first port and a second port and an air impingement assembly disposed between the first port and the second port. The air impingement assembly is arranged to provide a number of jets of air in a direction toward the food product. The air is for convection heating of the food product. A fan blower and a heater for heating the air also are provided. The air impingement assembly has a number of orifices, each of the orifices has a shape. The shape is suitable for the jets of heated air to penetrate heat in the food product, and the shape is suitable for the jets of heated air to sweep across the food product.

In a first embodiment, the air impingement oven has a number of orifices with a shape selected from the group consisting of: a circular shaped orifice, an "X" shaped orifice, a substantially "O" shaped orifice, an elliptical shaped orifice, a first "O" shaped orifice being surrounded by a number of second "O" shaped orifices, a cross shaped orifice having a first end, a second end, a third end, and a fourth end, with each of the first through fourth ends have an enlarged substantially circular tipped shape, a first "O" shaped orifice being in a second "O" shaped orifice in concentric relation, a round shaped orifice, and any combinations thereof.

In a second embodiment, the air impingement oven has the heated air with a temperature in a range of between about 400 degrees Fahrenheit to about 700 degrees Fahrenheit.

In another embodiment, the air impingement oven has a second heater, with the second heater for heating the food product opposite the air jets.

In still another embodiment, the air impingement oven has the second heater being under the conveyor.

In still yet another embodiment, the air impingement oven has the second heater being an infrared heater operating with an infrared heating temperature of between about 1400 degrees Fahrenheit to about 1800 degrees Fahrenheit.

In another embodiment, the air impingement oven has the fan blower being selected from the group consisting of: an axial flow type fan, a mixed flow type fan, a radial construction fan, and any combinations thereof.

In still another embodiment, the air impingement oven has a screen with the screen being disposed beneath the jets for balancing a pressure of the heated air exiting the air impingement assembly.

In a further embodiment, the air impingement oven has the orifices arranged in an array with the array for showering the food product on the conveyor with a first stream of air and a second stream of air and the first stream of air for sweeping the air across the food product and the second stream of air for delivering a concentrated stream of air to a top of the food product.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 10 is yet another embodiment of the base portion of the jet finger of FIG. 2 having a jack pattern orifice and a concentric orifice jet pattern;

DESCRIPTION OF THE PREFERRED EMBODIMENT

Figure 1:
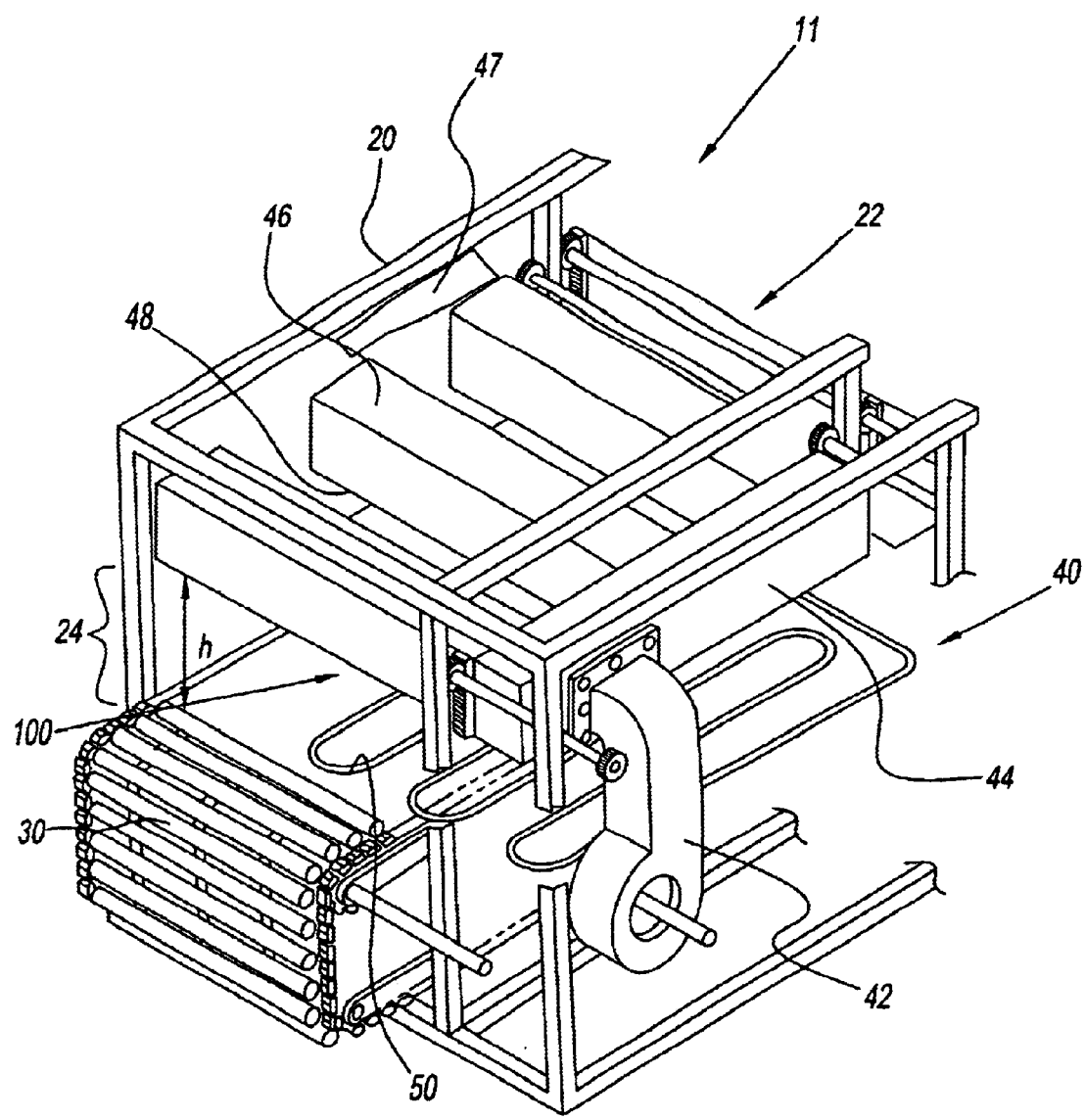
FIG. 1 is a cross sectional view of an oven with an air impingement heater having an improved orifice configuration of the present invention.

With reference to FIGS. 1 through 13, there is provided a high speed cooking device 11. The high speed cooking device 11 has a housing 20, a conveyer belt assembly 30, and an air impingement assembly 40. Additionally, a heater 50 may be employed with the high speed cooking device 11.

The housing 20 has an inlet point 22 and an outlet point 24. A raw food product enters the high speed cooking device 11 by the inlet point 22 and traverses by the conveyer belt assembly 30 to the outlet point 24 where the food emerges being cooked.

The air impingement assembly 40 is located preferably immediately above the conveyer belt assembly 30 as shown in FIG. 1. The conveyor belt assembly 30 and the air impingement assembly 40 are separated by a height, h. A cooking passageway is located in height h. Optionally, the heater 50, when used with the improved orifice configuration is located immediately below the conveyer belt assembly 30, and/or above the cooking passageway 100. The heater 50 is preferably electrically coupled to a power source (not shown).

A preferred feature of the present invention is that the air impingement assembly 40 rapidly heats food products (not shown) to a core temperature that corresponds to a desired temperature specified by a user of the high speed cooking device 11. For the accelerated impingement effect of the present invention, the temperature of the impingement air emitted from the air impingement assembly 40 is desirably in a range of between about 400 degrees to 700 degrees F.

Optionally, the heater 50 preferably is an infrared heater that produces infrared radiation incident on a lower surface and/or a side surface of the food, wherein the infrared heating temperature is between about 1,400 degrees to 1,800 degrees F.

The air impingement heater assembly 40 has a fan (not shown), a supply duct 42, a plenum 44, a number of jet fingers 46 each having a bottom surface 48. When used with the unique orifice configuration of the present invention, the jet fingers 46 may have an insert plate or screen 47. The insert plate 47 is positioned above the bottom surface 48. The insert plate 47 is intended to balance the air pressure in the jet fingers 46.

The fan (not shown) is suitably rated to generate a high velocity air stream relative to conventional fans and is disposed in the supply duct 42. The fan is preferably an axial flow type fan, a mixed flow type fan, a radial construction fan or any combinations thereof. The supply duct 42 may optionally have a second heater (not shown) for heating the air in the supply duct.

The supply duct 42 is fluidly connected to plenum 44. The plenum 44 is a rectangular shaped duct or a rounded shaped duct. The plenum 44 has a number of apertures that are fluidly connected to a number of jet fingers 46. The supply duct 42 communicates air to plenum 44 and in turn communicates the heated air to jet fingers 46. Jet fingers 46 preferably shower conveyor belt assembly 30 with heated air to cook or toast the food traversing the conveyor belt assembly. Preferably, the air escapes jet fingers 46 via one or more orifices 60 being on the bottom surface 48.

Figure 2:
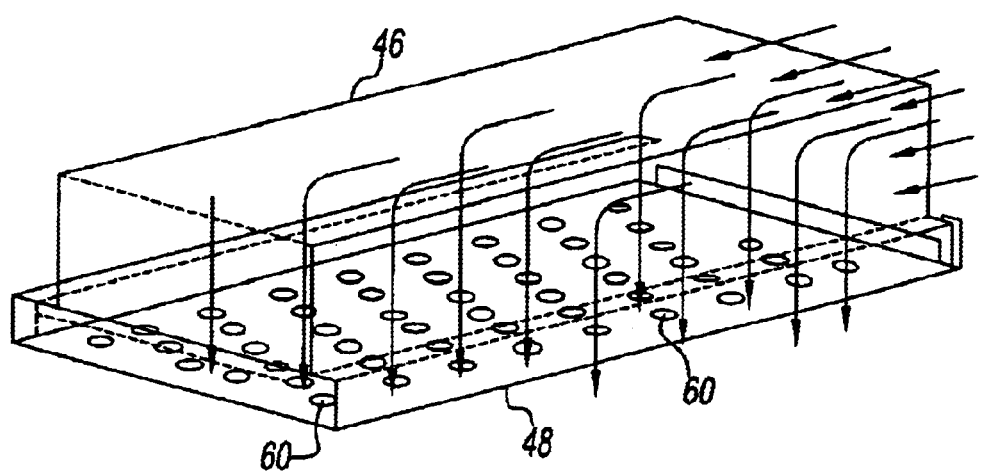
FIG. 2 is a cross sectional view of a jet finger of the oven of FIG. 1.

The bottom surface 48 preferably extends over the conveyer belt assembly 30 to define the cooking passageway 100. Referring to FIG. 2, the bottom surface 48 is generally flat and has one or more orifices 60 for directing air as impingement air toward the food traversing on the conveyor belt assembly 30. The heated air preferably is vented through the one or more orifices 60 on the bottom surface 48.

Figure 3:
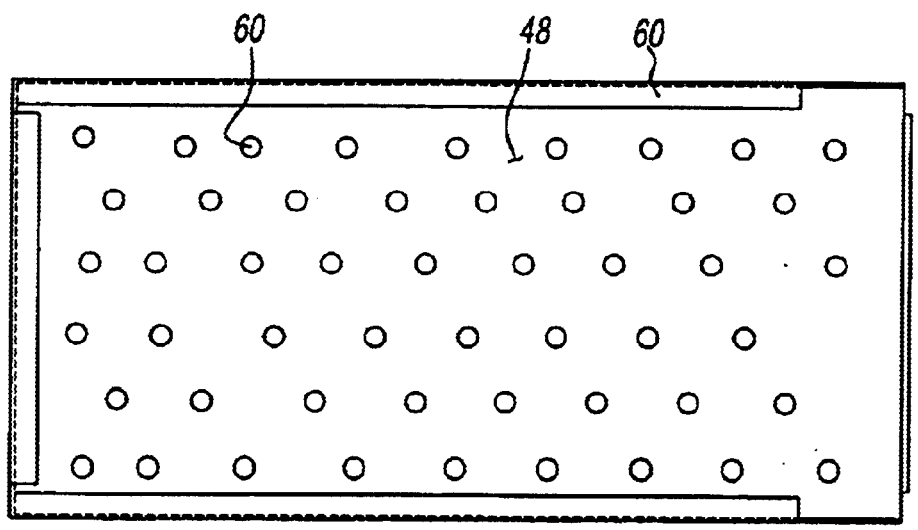
FIG. 3 is a bottom view of a base portion of the jet finger of FIG. 2 having an "O" shaped orifice configuration.
Figure 5:
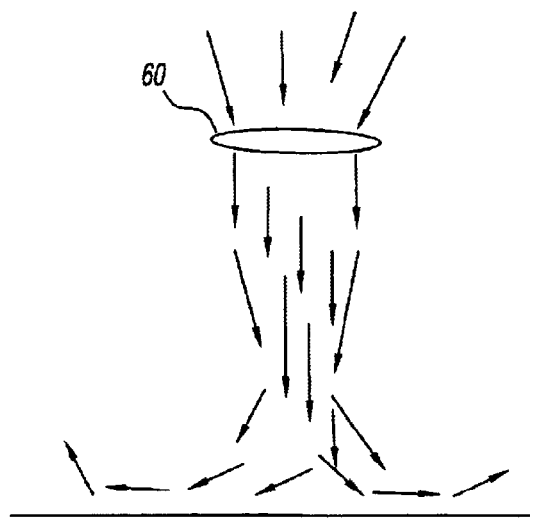
FIG. 5 is a view of the airflow through the "O" shaped orifice of FIG. 3.

The orifices 60 are arranged in an array. Referring to FIG. 3, although being shown, as having a generally circular, round "O" shaped orifices 60 this configuration is not optimal for all cooking applications. An "O" shaped orifice 60 delivers a sweeping contact around a side surface and a top surface of the food product as illustrated in FIG. 5. Although effective in cooking and/or toasting an outer surface of the food, a detriment exists. This is that an inner surface of the food can remain relatively less cooked due to only having this rounded "O" shaped orifice sweeping of the air stream across the food. Moreover, by sweeping more air to compensate for this detriment the outer surface may burn or blacken prior to the inner surface being cooked.

Figure 4:
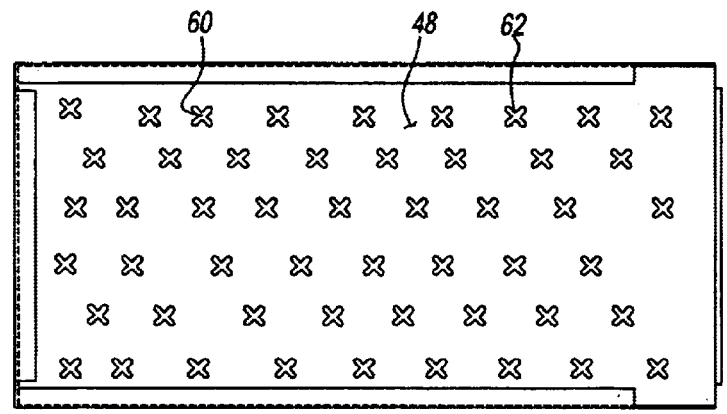
FIG. 4 is another embodiment of the base portion of the jet finger of FIG. 2 having an "X" shaped orifice configuration.
Figure 6:
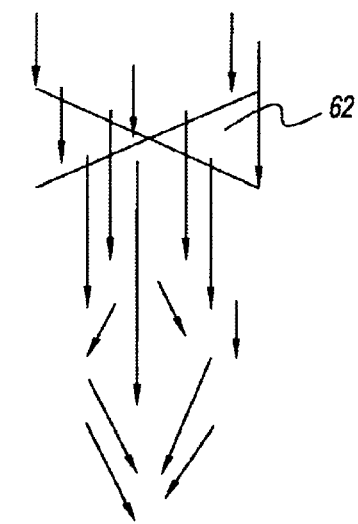
FIG. 6 is a view of the airflow through the "X" shaped orifice of FIG. 4.

Referring to FIG. 4, although being shown as having a generally "X" shaped orifices this configuration also is not suitable for all cooking applications by itself. An "X" shaped orifice 62 preferably delivers a concentrated air stream to a top surface of the food product as illustrated in FIG. 6. Although effective in penetrating heat to the inner surface of the food, the outer surface may not be baked or toasted as it is with the "O" shaped orifice 60.

A more preferred cooking is achieved by the present disclosure. The bottom surface 48 accordingly has both a number of "O" shaped orifices 60 and a number of "X" shaped orifices 62. Although it has been observed that placing a uniform array of "O" shaped orifices may reduce costs attributed to punching operations to form the orifices as shown in FIG. 3, the "X" shaped orifices 62 provide for increased heat transfer to penetrate into the food product. This provides for increased cooking in the inner surface of the food product as opposed to the effect on side surfaces and the top surfaces. This also provides for a decreased over all cooking time and improved uniformity of the multi-orifice effects.

Referring to FIG. 6, there is shown the air path of the air escaping from the "X" shaped orifice 62. As can be understood from the drawings, the "X" shaped orifice, alone or in combination with the "O" shaped orifices 60, obtains an increased penetration of heat energy into the food product by an improved focusing of the airflow. The "X" shaped orifice 62 obtains improved heat transfer from the airflow to the inner surface of the food product. This increased penetration of heat reduces the overall cooking time and increases productivity.

Figure 7:
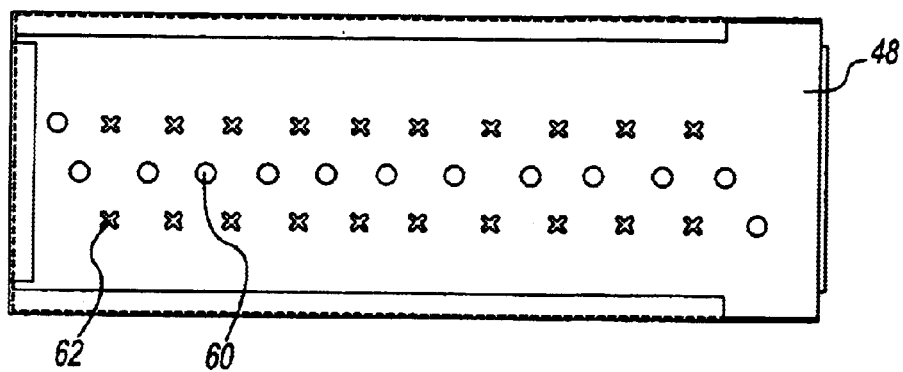
FIG. 7 is another embodiment of the base portion of the jet finger of FIG. 2 having an "X" and an "O" shaped orifice configuration.
Figure 7A:
FIG. 7A is a side view of the embodiment of the base portion of the jet finger of FIG. 7 having an "X" and an "O" shaped orifice configuration having a raised surface.

Referring to FIGS. 7 and 7A, an improved configuration of the bottom surface 48 with orifices is shown. The configuration has a row of "O" shaped orifices 60. The row of "O" shaped orifices 60 provides a desired amount of sweeping contact of the impingement air onto the food for cooking the outer and side surfaces of the food.

The bottom surface 48 also has a row of "X" shaped orifices 62. The "X" shaped orifices 62 will vent the impingement air at the same distance from the bottom surface 48 as the "O" shaped orifices 60 to penetrate the food and cook the inner surface of the food. This will thereby complement each other's effect onto the food that is disposed on the conveyor belt assembly 30. FIG. 7A shows another embodiment of the present invention. In this embodiment, the bottom surface 48 has one or more formed orifices 60 being raised on the surface.

Figure 7B:
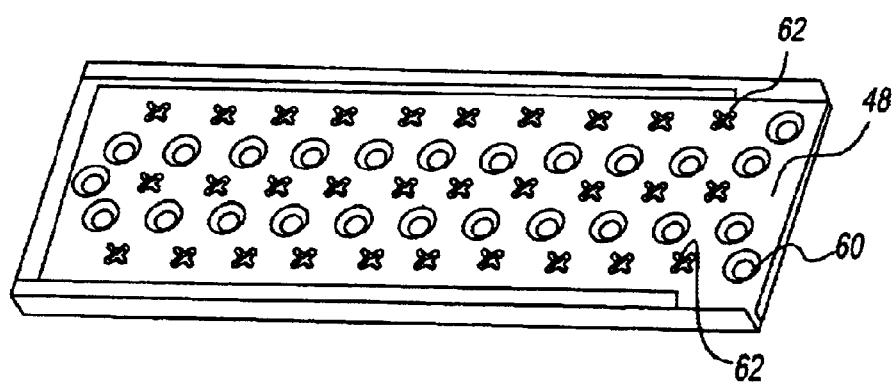
FIG. 7B is another embodiment of the base portion of the jet finger of FIG. 7.
Figure 7C:
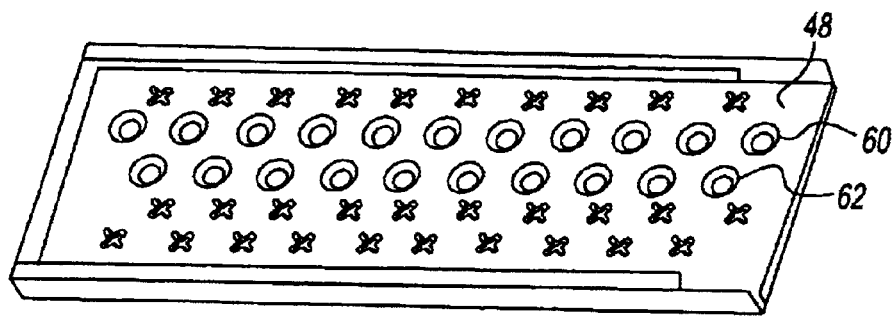
FIG. 7C is still another embodiment of the base portion of the jet finger of FIG. 7.

A given food product may benefit from the placement of a row of penetrating "X" orifices 62 prior in time to passing through the "O" shaped orifice 60 as shown in FIG. 7B. Referring to FIG. 7C, likewise the reverse is true. If more penetration is desired, one would fashion the bottom surface 48 to have more rows of "X" shaped orifices 62 than rows of "O" shaped orifices 60. If more blending/sweeping is desired, one would use more "O" shaped orifice 60 rows than "X" shaped orifice 62 rows.

Figure 8:
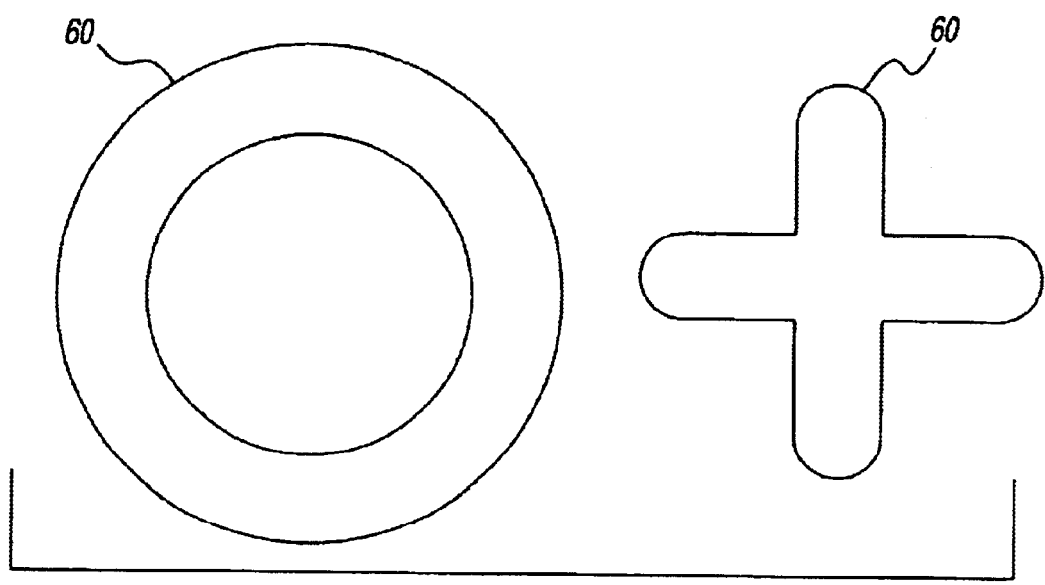
FIG. 8 is yet another embodiment of the base portion of the jet finger of FIG. 2 having an "X" and "O" shaped orifice configuration.

In one embodiment thereof shown in FIG. 8, the "X" shaped orifices 62 are arranged being adjacent to the "O" shaped orifices 60 in an alternating pattern. Preferably, an exemplary benefit is procured through the use of alternating rows of orifices as shown in FIG. 8. In this embodiment, the food product being cooked is affected by alternating sweeping and penetrating, respectively. Also, multiple rows of "X" shaped orifices being followed by multiple rows of "O" shaped orifices would amplify this effect being shown in FIG. 7C.

Figure 9:
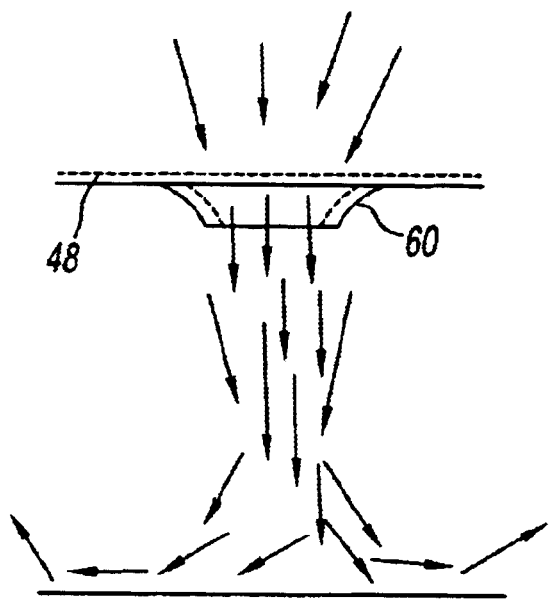
FIG. 9 is still another embodiment of the base portion of the jet finger of FIG. 2.

In another embodiment as shown in FIG. 9, the "O" shaped orifice may have a broader focal point than an "X" shaped orifice. In this embodiment, the "O" shaped orifice is preferably ¼ to ¾ inch in diameter. This broader focal point allows for an increased focused sweeping and heating of the food that is disposed on the conveyor belt assembly 30, as shown as FIG. 9.

Figure 10A:
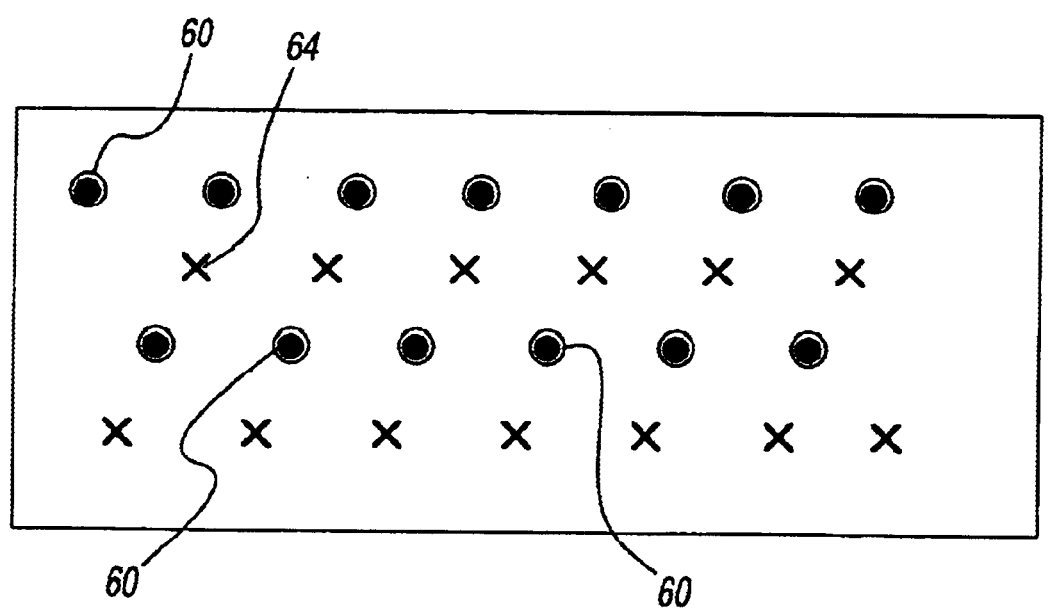
FIG. 10A is a view of the airflow through the concentric orifice jet pattern of FIG. 10.
Figure 12:
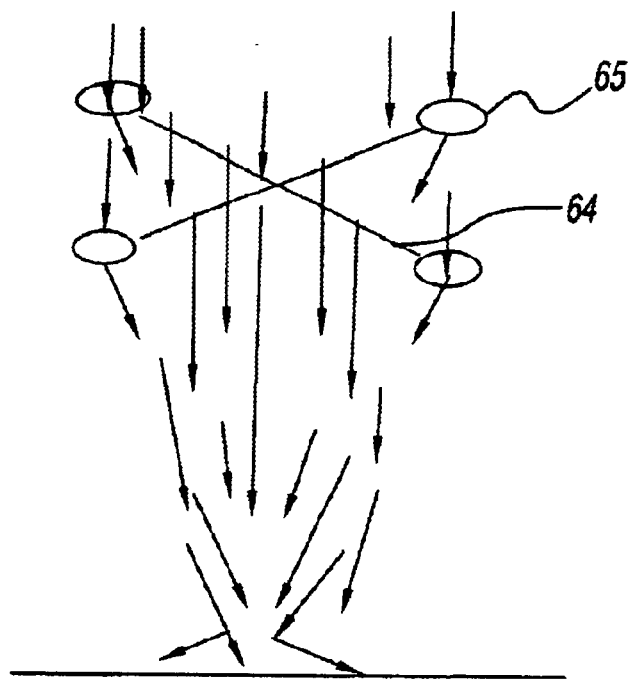
FIG. 12 is a view of the airflow through the jack pattern orifice of FIG. 10.

The "O" shaped orifice 60 may also be used in combination with a jack pattern 64 as shown in FIG. 10A. The jack pattern orifice 64 has accentuated round tips 65. As is shown in FIG. 12, the jack pattern orifice 64 focuses heat in a set of intense point contacts. The jack pattern orifice 64 together or in combination with another orifice directs heated air to a specific point on the surface of the food for an overall reduced cooking time.

In this manner, the round tips 65 sweep the air over the food to cook the outer surface, while the remainder of the jack pattern focuses air to penetrate the food product and cook the inner surface.

Figure 10B:
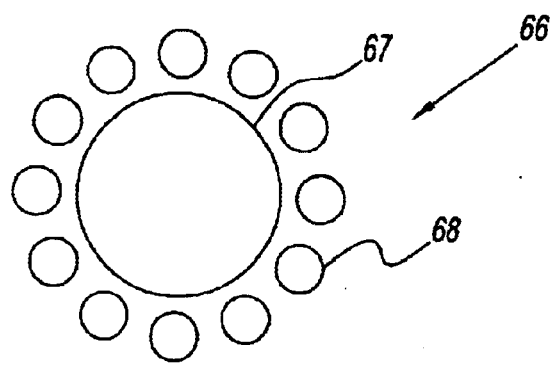
FIG. 10B is a top view of a concentric orifice.
Figure 11:
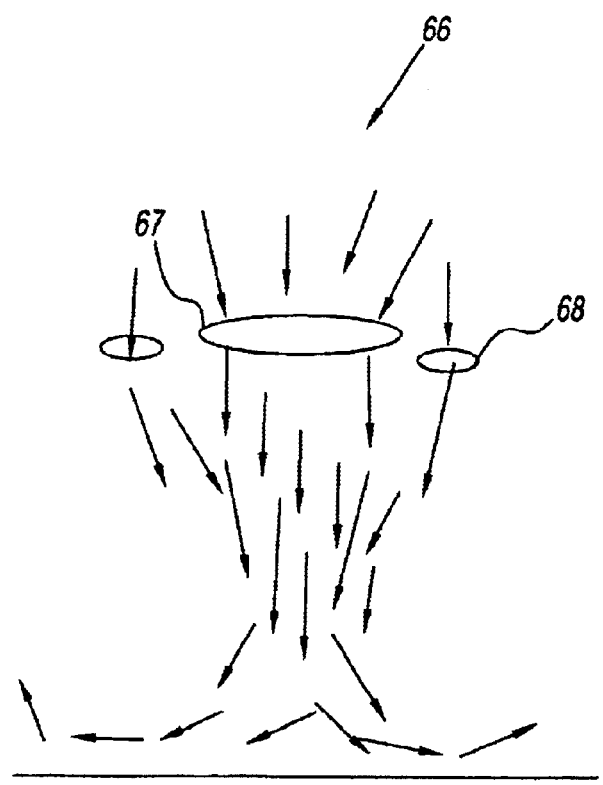
FIG. 11 is a view of the airflow through the concentric orifice pattern being shown in FIG. 10B.

In another exemplary embodiment of the present invention being shown in FIG. 10B, a concentric orifice jet pattern 66 may be also disposed on the bottom surface 48 thereof. The concentric orifice jet pattern 66 may have one "O" shaped orifice 67 surrounded by an array of relatively smaller "O" shaped orifices 68 where a radius of the center most "O" shaped orifice 67 is greater than a radius of the smaller "O" shaped orifices 68. The smaller orifices 68 preferably vent a higher velocity air stream relative to the larger center most orifice 67. This preferably provides an intense more penetrating contact to cook the inner surface of the food as shown in FIG. 11.

Figure 13:
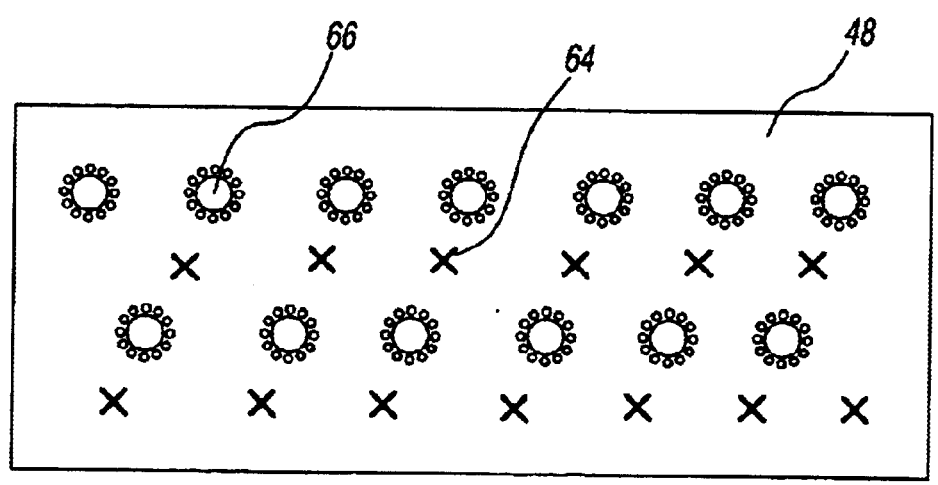
FIG. 13 is yet another embodiment of the base portion of the jet finger of FIG. 2 having both the concentric orifice jet pattern and the jack pattern orifice.

Referring to FIG. 13, an alternative embodiment is shown of the bottom surface 48. The bottom surface 48 has a combination of the jack pattern orifice 64 and the concentric orifice jet pattern 66 being shown. The bottom surface 48 may have a vertical row of jack pattern orifices 64 and alternating rows of the concentric orifice jet pattern 66 being shown.

This embodiment may be suitable for high impingement jet intensity relative to the "O" shaped orifices alone on the bottom surface 48. This improves the overall heat transfer onto the surface of the food that is disposed on the conveyor belt assembly 30 for cooking, baking and toasting the food that is passed to outlet point 24.

The present invention having been thus described with particular reference to the preferred forms thereof, it will be obvious that various changes and modifications may be made therein without departing from the spirit and scope of the present invention as defined in the appended claims.

What is claimed is:

1. An air impingement oven comprising:
   a conveyor that conveys a food product between a first port and a second port;
   an air impingement assembly disposed between said first port and said second port, said air impingement assembly arranged to provide a plurality of jets of air in a direction toward said food product, said air for convection heating of said food product;
   a fan blower; and
   a heater for heating said air, wherein said air impingement assembly comprises an air direction plate having a plurality of different shaped orifices disposed therein suitable for providing a plurality of different jets of heated air for cooking said food product.

2. The air impingement oven of claim 1, wherein said shape is selected from the group consisting of a circular shaped orifice, an "X" shaped orifice, a substantially "O" shaped orifice, an elliptical shaped orifice, a first "O" shaped orifice being surrounded by a plurality of second "O" shaped orifices, a cross shaped orifice having a first end, a second end, a third end, and a fourth end, wherein each of said first through fourth ends have an enlarged substantially circular tipped shape, a first "O" shaped orifice being in a second "O" shaped orifice in concentric relation, a round shaped orifice, and any combinations thereof.

3. The air impingement oven of claim 1, wherein said heated air has a temperature, said temperature being in a range that includes about 400 degrees Fahrenheit to about 700 degrees Fahrenheit.

4. The air impingement oven of claim 1, further comprising a second heater, said second heater for heating said food product opposite said plurality of air jets.

5. The air impingement oven of claim 4, wherein said second heater is disposed a distance under said conveyor.

6. The air impingement oven of claim 4, wherein said second heater is an infrared heater, said infrared heater operating at a temperature of between about 1400 degrees Fahrenheit to about 1800 degrees Fahrenheit.

7. The air impingement oven of claim 1, further comprising a screen, said screen being disposed beneath said plurality of jets of air, said screen for balancing a pressure of said heated air exiting said air impingement assembly.

8. The air impingement oven of claim 1, wherein said plurality of orifices are arranged in an array, said array for showering said food product on said conveyor with a first stream of air and a second stream of air, said first stream of air for sweeping said air across said food product and said second stream of air for delivering a concentrated stream of air to a top of said food product.

9. An air impingement oven comprising:
a conveyor belt that conveys a food product between a first port and a second port;
an air impingement assembly having a plurality of jet fingers, said plurality of jet fingers being disposed between said first port and said second port and arranged to provide a plurality of jets of air on said food product;
a fan blower being connected to said plurality of jet fingers; and
a heater for heating said air, wherein said air impingement assembly has a plurality of orifices having a plurality of shapes for emitting said heated air through said plurality of orifices, said plurality of shapes being capable of both penetrating heated air into a top said of said food product and sweeping heated air across said food product.

10. The air impingement oven of claim 9, wherein said plurality of shapes are selected from the group consisting of: a circular shaped orifice, an "X" shaped orifice, an "O" shaped orifice, an elliptical shaped orifice, a first "O" shaped orifice being surrounded by a plurality of second "O" shaped orifices, a first concentric circular shaped orifice in a second circular shaped orifice, a cross shaped orifice having a first end, a second end, a third end, and a fourth end, wherein each of said first through fourth ends has an enlarged substantially circular tipped shape relative to a remainder of said cross shaped orifice, a round shaped orifice, and any combinations thereof.

11. The air impingement oven of claim 9, wherein some of said shapes are at least circular shaped orifices having a diameter in a range between about 0.25 inches to 0.75 inches.

12. The air impingement oven of claim 10, wherein said plurality of orifices have at least two different shapes arranged in a first row and in a second row.

13. The air impingement oven of claim 12, wherein said orifices comprises at least a first "X" shaped orifice and a second "O" shaped orifice, said first "X" shaped orifice emitting a first heated air stream, said second "O" shaped orifice emitting a second heated air stream, wherein said first heated air stream penetrates heat into a top side of said food product thereby cooking a centermost portion of said food product and said second heated air stream for sweeping said second heated air stream across said food product thereby cooking an outermost first lateral side and an outermost second lateral side of said food product relative to said center most portion of said food product.

14. The air impingement oven of claim 13, wherein said first heated air stream and said second heated air stream both have a temperature in a range between about 400 degrees Fahrenheit to about 700 degrees Fahrenheit.

15. The air impingement oven of claim 9, further comprising a screen, said screen being disposed beneath said plurality of jet fingers, said screen for balancing a pressure of said air exiting said plurality of jet fingers.

16. The air impingement oven of claim 10, wherein said orifices comprise at least one first "O" shaped orifice having a first diameter, and a second "O" shaped orifice having a second diameter, wherein said first diameter is greater than said second diameter, wherein said second "O" shaped orifice emits a second heated air stream, wherein said second heated air stream exits said second "O" shaped orifice at a relatively higher velocity relative to a first heated air stream exiting said first "O" shaped orifice.

17. The air impingement oven of claim 10, wherein said plurality of shapes have at least one orifice of said plurality of orifices having a first slot being intersected by a second slot defining an intersection with a first end, a second end, a third end, and a fourth end, with each of the first through fourth ends having a bulbous shaped slot connected thereto.

18. The air impingement oven of claim 17, further comprising a row of shaped orifices have at least one first "O" shaped orifice having a first diameter, and a second "O" shaped orifice having a second diameter, wherein said first diameter is greater than said second diameter, said second "O" shaped orifice emitting a second heated air stream, wherein said second heated air stream exits said second "O" shaped orifice at a relatively higher velocity relative to a first heated air stream exiting said first "O" shaped orifice.

19. An air impingement oven comprising:
a conveyor belt that conveys a food product between a first port and a second port;
an air impingement assembly having a plurality of jet fingers, said plurality of jet fingers being disposed between said first port and said second port and arranged to provide a plurality of jets of air on said food product;
a fan blower being connected to said plurality of jet fingers;
a first heater for heating said air; and
a second heater for heating a bottom of said food product, wherein said air impingement assembly has a plurality of orifices, each of said plurality of orifices having a plurality of shapes being suitable for said plurality of jet fingers emitting said heated air through said plurality of orifices, said plurality of shapes of said plurality of orifices for both penetrating heated air into a top of said food product and sweeping heated air across a side of said food product, wherein said plurality of shapes are selected from the group consisting of a circular shaped orifice, an "X" shaped orifice, an "O" shaped orifice, an elliptical shaped orifice, a first "O" shaped orifice being surrounded by a plurality of second "O" shaped orifices, a first concentric circular shaped orifice in a second circular shaped orifice, a cross shaped orifice having a first end, a second end, a third end, and a fourth end, wherein each of said first through fourth ends has an enlarged tipped shape relative to said cross shaped orifice, a round shaped orifice, and any combinations thereof.

20. An air impingement oven comprising:
an air diverter plate having at least two differently shaped orifices;
a conveyor belt that conveys a food product between a first port and a second port;
an air impingement assembly having a plurality of jet fingers, said plurality of jet fingers being disposed between said first port and said second port and arranged to provide a plurality of jets of air on said food product through said air diverter plate;

a fan blower being connected to said plurality of jet fingers;

a first heater for heating said air; and a second heater for heating a bottom of said food product.

21. The air impingement oven of claim 20, wherein said at least two differently shaped orifices both penetrate heated air into a top of said food product and sweeping heated air across a side of said food product.

22. The air impingement oven of claim 21, wherein said plurality of shapes are selected from the group consisting of a circular shaped orifice, an "X" shaped orifice, an "O" shaped orifice, an elliptical shaped orifice, a first "O" shaped orifice being surrounded by a plurality of second "O" shaped orifices, a first concentric circular shaped orifice in a second circular shaped orifice, a cross shaped orifice having a first end, a second end, a third end, and a fourth end, wherein each of said first through fourth ends has an enlarged tipped shape relative to said cross shaped orifice, a round shaped orifice, and any combinations thereof.

23. The air impingement oven of claim 21, wherein said heated air has a temperature in a range that includes about 400 degrees Fahrenheit to about 700 degrees Fahrenheit.

24. The air impingement oven of claim 21, wherein said second heater is disposed a distance under said conveyor.

25. The air impingement oven of claim 24, wherein said second heater is an infrared heater operating at about 1400 degrees Fahrenheit to about 1800 degrees Fahrenheit.

26. The air impingement oven of claim 21, further comprising a screen, said screen being disposed beneath said plurality of jets of air, said screen for balancing a pressure of said heated air exiting said air impingement assembly.

* * * * *